(12) United States Patent
Suzuki et al.

(10) Patent No.: US 8,141,341 B2
(45) Date of Patent: Mar. 27, 2012

(54) VEHICLE AND CONTROL METHOD OF VEHICLE

(75) Inventors: Takashi Suzuki, Toyota (JP); Yoshikazu Asami, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 493 days.

(21) Appl. No.: 12/485,336

(22) Filed: Jun. 16, 2009

(65) Prior Publication Data

US 2009/0308055 A1  Dec. 17, 2009

(30) Foreign Application Priority Data

Jun. 17, 2008  (JP) .................................. 2008-157639

(51) Int. Cl.
*F01N 3/00* (2006.01)

(52) U.S. Cl. ................ 60/277; 60/274; 60/285; 60/286; 60/295; 60/301

(58) Field of Classification Search .................... 60/247, 60/277, 284–287, 295–301
See application file for complete search history.

(56) References Cited

U.S. PATENT DOCUMENTS

| | | | | |
|---|---|---|---|---|
| 3,921,396 | A * | 11/1975 | Nohira | 60/290 |
| 6,588,205 | B1 * | 7/2003 | Kumagai et al. | 60/298 |
| 7,143,577 | B2 * | 12/2006 | Yoshioka | 60/285 |
| 7,404,289 | B2 * | 7/2008 | Miwa et al. | 60/285 |
| 7,469,530 | B2 * | 12/2008 | Fujiwara et al. | 60/285 |
| 7,624,568 | B2 * | 12/2009 | Ando et al. | 60/277 |

FOREIGN PATENT DOCUMENTS

| | | |
|---|---|---|
| JP | 08144814 | 6/1996 |
| JP | 10266886 | 10/1998 |
| JP | 2005147082 | 6/2005 |
| JP | 2005351127 | 12/2005 |

* cited by examiner

*Primary Examiner* — Thomas Denion
*Assistant Examiner* — Jesse Bogue
(74) *Attorney, Agent, or Firm* — Gifford, Krass, Sprinkle, Anderson & Citkowski, P.C.

(57) ABSTRACT

The catalyst smell reducing control in which the fuel cutoff is performed is not executed regardless of the catalyst smelling flag Fs1 equal to '1' (step S140) when the vehicle speed V becomes less than the preset vehicle speed Vref (step S130) while the catalyst deterioration reducing control in which the fuel cutoff is prohibited is being executed (step S150). Such control prevents from executing the catalyst smell reducing control while the suspension of the catalyst deterioration reducing control and prevents performing the fuel cutoff after performing a fuel injection and performing the fuel injection again for a relatively short time in the internal combustion engine. Therefore, it is enabled to reduce an occurrence of a shock due to the temporal decline of the output torque from the internal combustion engine, and is thereby enabled to reduce a sense of incompatibility given to the driver or passenger by reducing the occurrence of the shock due to the execution of the catalyst deterioration reducing control and the catalyst smell reducing control.

6 Claims, 8 Drawing Sheets

VEHICLE AND CONTROL METHOD OF VEHICLE

This Application claims priority of Japanese Patent Application No. 2008-157639 filed on Jun. 17, 2008, which is incorporated herein by reference.

TECHNICAL FIELD

The present invention relates to a vehicle and a control method of the vehicle. More specifically the invention pertains to a vehicle that comprises an internal combustion engine having a fuel injection unit that injects fuel and a purifying catalyst that purifies exhaust gas, and a control method of the vehicle.

BACKGROUND ART

One proposed vehicle comprises an internal combustion engine having a purifying catalyst that purifies exhaust gas, an electronic control unit that executes a catalyst deterioration reducing control upon a satisfaction of a catalyst deterioration acceleration condition that accelerates deterioration of the purifying catalyst and executes a catalyst smell reducing control upon a satisfaction of a catalyst smelling condition that makes the purifying catalyst smell (see, for example, Patent Document 1). This vehicle is described as a vehicle, giving a high priority to executing the catalyst deterioration reducing control that prohibits a fuel cutoff when a vehicle speed is more than or equal to a preset vehicle speed, and giving a high priority to executing the catalyst smell reducing control that performs the fuel cutoff when the vehicle speed becomes less than the preset vehicle speed, in consideration that there are few cases to give the driver or passenger unpleasantness since the catalyst smell does not stay near the vehicle during its drive at a high or middle vehicle speed.

Patent Document 1: Japanese Patent Laid-Open No. 2005-147082

DISCLOSURE OF THE INVENTION

In this prior art vehicle, a high priority is given to executing the catalyst smell reducing control even though the catalyst deterioration reducing control is being executed when the vehicle speed becomes less than the preset vehicle speed. There is accordingly a case where the execution of the catalyst smell reducing control is started before the completion of the catalyst deterioration reducing control. In this case, the execution of the catalyst deterioration reducing control is resumed when the catalyst smell reducing control is completed. Accordingly, in the internal combustion engine, the fuel cutoff is performed after a fuel injection is performed and the fuel injection is then performed again. Therefore, there is a case where the vehicle gives the driver or passenger unpleasantness with a shock to the vehicle due to a time period of a decline of output torque from the internal combustion engine during the fuel cutoff.

In the vehicle of the invention and the control method of the vehicle, the main object of the invention is to reduce a sense of incompatibility given to the driver or passenger by reducing an occurrence of a shock due to the execution of the catalyst deterioration reducing control and the catalyst smell reducing control.

In order to attain at least the main object, the vehicle of the invention and the control method of the vehicle have the configurations discussed below.

According to one aspect, the present invention is directed to a vehicle. The vehicle comprises: an internal combustion engine having a fuel injection unit that injects fuel and a purifying catalyst that purifies exhaust gas; a vehicle speed measurement unit that measures a vehicle speed; a catalyst deterioration reducing control module configured to execute a catalyst deterioration reducing control that operates the internal combustion engine while prohibiting a cutoff of fuel injection of the fuel injection unit upon a satisfaction of a catalyst deterioration acceleration condition that accelerates deterioration of the purifying catalyst; and a catalyst smell reducing control module configured to execute a catalyst smell reducing control that operates the internal combustion engine while making the fuel injection unit perform the cutoff of fuel injection when the measured vehicle speed becomes less than a specific vehicle speed upon a satisfaction of a catalyst smelling condition that makes the purifying catalyst smell, and the catalyst smell reducing control module configured not to execute the catalyst smell reducing control regardless of the satisfaction of the catalyst smelling condition when the measured vehicle speed becomes less than the specific vehicle speed while the catalyst deterioration reducing control is being executed.

The vehicle according to this aspect of the invention, executes a catalyst smell reducing control that operates the internal combustion engine while making the fuel injection unit perform the cutoff of fuel injection when a vehicle speed becomes less than a specific vehicle speed upon a satisfaction of a catalyst smelling condition that makes the purifying catalyst smell, and does not execute the catalyst smell reducing control regardless of the satisfaction of the catalyst smelling condition when the vehicle speed becomes less than the specific vehicle speed while the catalyst deterioration reducing control that operates the internal combustion engine while prohibiting the cutoff of fuel injection of the fuel injection unit is being executed. This arrangement prevents the vehicle from executing the catalyst smell reducing control before the completion of the catalyst deterioration reducing control and executing again the catalyst deterioration reducing control after the completion of the catalyst smell reducing control, and it is accordingly prevented in the internal combustion engine to perform the fuel cutoff after performing a fuel injection and perform the fuel injection again for a relatively short time. Therefore, this arrangement enables to reduce an occurrence of a shock to the vehicle, and enables to reduce thereby a sense of incompatibility given to the driver or passenger by reducing the occurrence of the shock due to the execution of the catalyst deterioration reducing control and the catalyst smell reducing control.

In one preferable embodiment of the vehicle of the invention, the vehicle further comprises: an automatic start stop module configured to stop automatically the internal combustion engine upon a satisfaction of a specific stop condition, and start automatically the internal combustion engine upon a satisfaction of a specific start condition; and a motoring unit configured to perform a motoring of the internal combustion engine; wherein the catalyst smell reducing control module executes the catalyst smell reducing control while making the motoring unit perform the motoring of the internal combustion engine regardless of whether the catalyst deterioration reducing control is being executed when the specific stop condition and the catalyst smelling condition are satisfied, and wherein the catalyst smell reducing control module makes the motoring unit stop the motoring of the internal combustion engine so that the automatic start stop module stops the internal combustion engine when it is completed to execute the catalyst smell reducing control. This arrangement enables to execute the catalyst smell reducing control more assuredly. The vehicle of this embodiment preferably includes: a motor capable of inputting and outputting power; and a three shaft-type power input output structure that is linked to three shafts, a driveshaft that is connected with an axle, an output shaft of the internal combustion engine, and a rotating shaft of the motor, and inputs and outputs power from and to a residual shaft based on powers input and output from and to any two shafts among the three shafts.

In one preferable application of the vehicle of the invention, the catalyst deterioration reducing control module regards that the catalyst deterioration acceleration condition is satisfied when a temperature of the purifying catalyst is greater than or equal to a first preset temperature to execute the catalyst deterioration reducing control.

In another preferable application of the invention, the catalyst smell reducing control module regards that the catalyst smelling condition is satisfied when there is a historical record of an increase injection in which the fuel injection unit injects more fuel than a fuel injection amount based on a stoichiometric air-fuel ratio, the purifying catalyst has not been exposed to a lean atmosphere since the increase injection, and a temperature of the purifying catalyst is greater than or equal to a second preset temperature, to execute the catalyst smell reduction control.

According to another aspect, the present invention is directed to a control method of a vehicle. The vehicle comprises an internal combustion engine having a fuel injection unit that injects fuel and a purifying catalyst that purifies exhaust gas. The control method includes steps of: (a) executing a catalyst deterioration reducing control that operates the internal combustion engine while prohibiting a cutoff of fuel injection of the fuel injection unit upon a satisfaction of a catalyst deterioration acceleration condition that accelerates deterioration of the purifying catalyst, and (b) executing a catalyst smell reducing control that operates the internal combustion engine while making the fuel injection unit perform the cutoff of fuel injection when a vehicle speed becomes less than a specific vehicle speed upon a satisfaction of a catalyst smelling condition that makes the purifying catalyst smell, and not executing the catalyst smell reducing control regardless of the satisfaction of the catalyst smelling condition when the vehicle speed becomes less than the specific vehicle speed while the catalyst deterioration reducing control is being executed.

The control method of the vehicle according to this aspect of the invention, executes a catalyst smell reducing control that operates the internal combustion engine while making the fuel injection unit perform the cutoff of fuel injection when a vehicle speed becomes less than a specific vehicle speed upon a satisfaction of a catalyst smelling condition that makes the purifying catalyst smell, and does not execute the catalyst smell reducing control regardless of the satisfaction of the catalyst smelling condition when the vehicle speed becomes less than the specific vehicle speed while the catalyst deterioration reducing control that operates the internal combustion engine while prohibiting the cutoff of fuel injection of the fuel injection unit is being executed. This arrangement prevents the vehicle from executing the catalyst smell reducing control before the completion of the catalyst deterioration reducing control and executing again the catalyst deterioration reducing control after the completion of the catalyst smell reducing control, and it is accordingly prevented in the internal combustion engine performing the fuel cutoff after performing a fuel injection and performing the fuel injection again for a relatively short time. Therefore, this arrangement enables to reduce an occurrence of a shock to the vehicle, and enables to reduce thereby a sense of incompatibility given to the driver or passenger by reducing the occurrence of the shock due to the execution of the catalyst deterioration reducing control and the catalyst smell reducing control.

In one preferable embodiment of the control method of the vehicle of the invention, the vehicle further comprising a motoring unit configured to perform a motoring of the internal combustion engine; wherein step (c) stops automatically the internal combustion engine upon a satisfaction of a specific stop condition, and starts automatically the internal combustion engine upon a satisfaction of a specific start condition; wherein the step (b) executes the catalyst smell reducing control while making the motoring unit perform the motoring of the internal combustion engine regardless of whether the catalyst deterioration reducing control is being executed when the specific stop condition and the catalyst smelling condition are satisfied, and wherein the step (b) makes the motoring unit stop the motoring of the internal combustion engine to stop the internal combustion engine in the step (c) when it is completed to execute the catalyst smell reducing control. This arrangement enables to execute the catalyst smell reducing control more assuredly.

BEST MODES OF CARRYING OUT THE INVENTION

Figure 1:
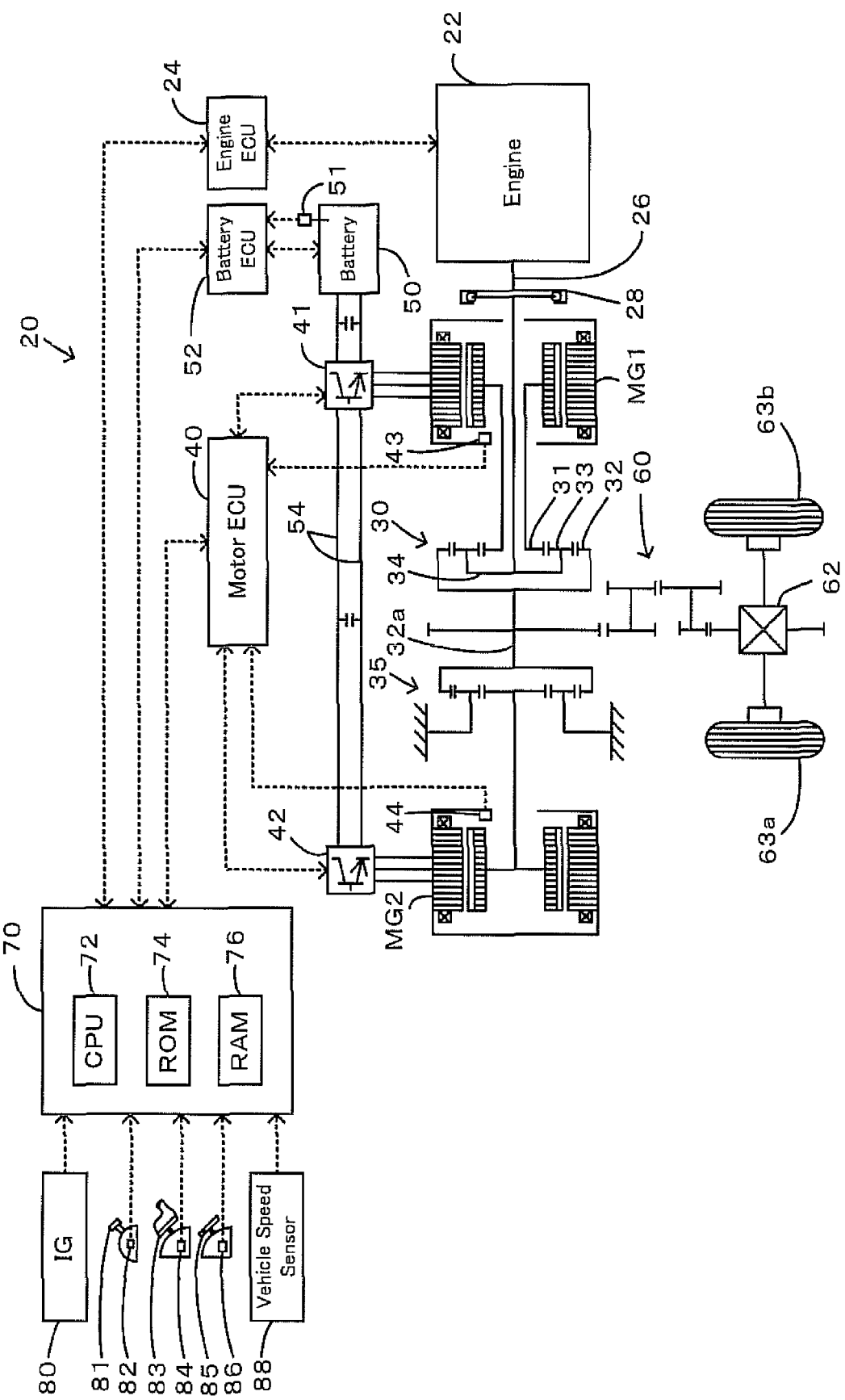
FIG. 1 schematically illustrates the configuration of a hybrid vehicle 20 in one embodiment of the invention.

One mode of carrying out the invention is discussed below as a preferred embodiment. FIG. 1 schematically illustrates the configuration of a hybrid vehicle 20 in one embodiment of the invention. As illustrated, the hybrid vehicle 20 of the embodiment includes an engine 22, a three shaft-type power distribution integration mechanism 30 that is linked with a crankshaft 26 functioning as an output shaft of the engine 22 via a damper 28, a motor MG1 that is linked with the power distribution integration mechanism 30 and is capable of generating electric power, a reduction gear 35 that is attached to a ring gear shaft 32a functioning as a drive shaft connected with the power distribution integration mechanism 30, another motor MG2 that is linked with the reduction gear 35, and a hybrid electronic control unit 70 that controls the whole hybrid vehicle 20.

Figure 2:
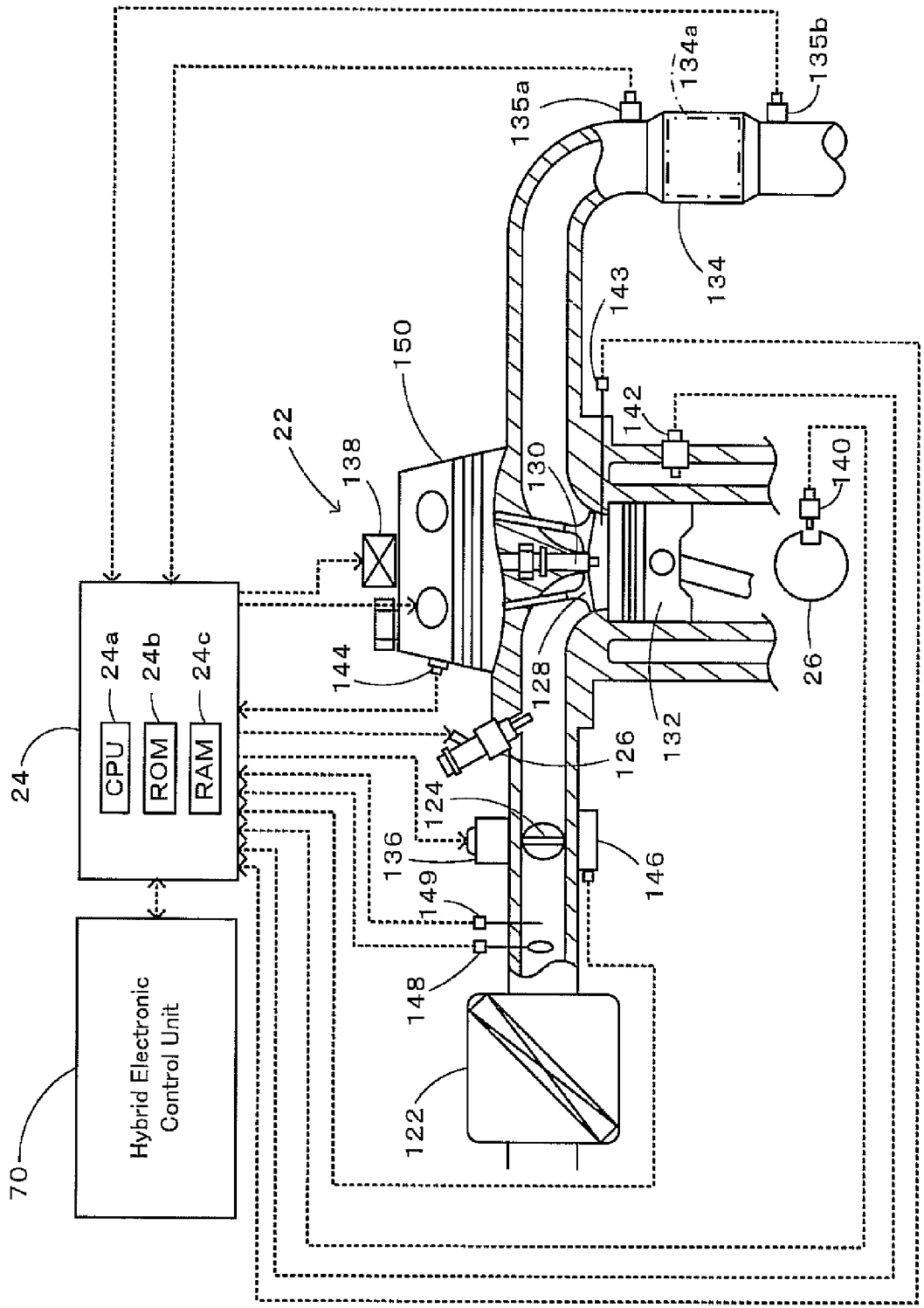
FIG. 2 schematically shows the structure of an engine 22.

The engine 22 is an internal combustion engine that consumes a hydrocarbon fuel, such as gasoline or light oil, to output power. As shown in FIG. 2, the air cleaned by an air cleaner 122 and taken in via a throttle valve 124 is mixed with the atomized gasoline injected by a fuel injection valve 126 to the air-fuel mixture. The air-fuel mixture is introduced into a combustion chamber via an intake valve 128. The introduced air-fuel mixture is ignited with spark made by a spark plug 130 to be explosively combusted. The reciprocating motions of a piston 132 by the combustion energy are converted into rotational motions of a crankshaft 26. The exhaust from the engine 22 goes through a catalytic conversion unit 134 (three-way catalyst 134a) to convert toxic components included in the exhaust, that is, carbon monoxide (CO), hydrocarbons (HC), and nitrogen oxides (NOx), into harmless components, and is discharged to the outside air.

The engine 22 is under control of an engine electronic control unit (hereafter referred to as engine ECU) 24. The engine ECU 24 is constructed as a microprocessor including a CPU 24a, a ROM 24b that stores processing programs, a RAM 24c that temporarily stores data, input and output ports (not shown), and a communication port (not shown). The engine ECU 24 receives, via its input port, signals from various sensors that measure and detect the operating conditions of the engine 22. The signals input into the engine ECU 24 include a crank position from a crank position sensor 140 detected as the rotational position of the crankshaft 26, a cooling water temperature from a water temperature sensor 142 measured as the temperature of cooling water in the engine 22, an in-cylinder pressure from a pressure sensor 143 located inside the combustion chamber, a cam position from a cam position sensor 144 detected as the rotational position of a camshaft driven to open and close the intake valve 128 and an exhaust valve for gas intake and exhaust into and from the combustion chamber, a throttle valve position from a throttle valve position sensor 146 detected as the position of the throttle valve 124, an air flow meter signal from an air flow meter 148 attached to an air intake conduit, an intake air temperature from a temperature sensor 149 attached to the air intake conduit, an air/fuel ratio from an air/fuel ratio sensor 135a attached to an exhaust conduit, and an oxygen signal VO from an oxygen sensor 135b attached to the exhaust conduit. The engine ECU 24 outputs, via its output port, diverse control signals and driving signals to drive and control the engine 22, for example, driving signals to the fuel injection valve 126, driving signals to a throttle valve motor 136 for regulating the position of the throttle valve 124, control signals to an ignition coil 138 integrated with an igniter, and control signals to a variable valve timing mechanism 150 to vary the open and close timings of the intake valve 128. The engine ECU 24 communicates with the hybrid electronic control unit 70 to drive and control the engine 22 in response to control signals received from the hybrid electronic control unit 70 and to output data regarding the operating conditions of the engine 22 to the hybrid electronic control unit 70 according to the requirements. The engine ECU 24 also computes a rotation speed of the crankshaft 26 which is equivalent to a rotation speed Ne of the engine 22 based on the crank position from the crank position sensor 140, and computes a load factor KL representing a ratio of the amount of intake air specified by the air flow meter signal from the air flow meter 148 to a maximum possible amount of intake air.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is under control and management of a battery electronic control unit (hereafter referred to as battery ECU) 52. The battery ECU 52 receives signals required for management and control of the battery 50, for example, an inter-terminal voltage from a voltage sensor (not shown) located between terminals of the battery 50, a charge-discharge current from a current sensor (not shown) located in the power line 54 connecting with an output terminal of the battery 50, and a battery temperature Tb from a temperature sensor 51 attached to the battery 50. The battery ECU 52 computes a remaining charge level or current state of charge (SOC) of the battery 50. The battery ECU 52 also computes a charge discharge power demand Pb* as a required power level for charging or discharging the battery 50, based on the computed state of charge (SOC), the input battery temperature Tb, and input and output limits Win and Wout of the battery 50. The battery ECU 52 outputs these and other data regarding the operating conditions of the battery 50 by communication to the hybrid electronic control unit 70 according to the requirements.

The hybrid electronic control unit 70 is constructed as a microprocessor including a CPU 72, a ROM 74 that stores processing programs, a RAM 76 that temporarily stores data, input and output ports (not shown), and a communication port (not shown). The hybrid electronic control unit 70 receives, via its input port, an ignition signal from an ignition switch 80, a gearshift position SP or a current setting position of a gearshift lever 81 from a gearshift position sensor 82, an accelerator opening Acc or the driver's depression amount of an accelerator pedal 83 from an accelerator pedal position sensor 84, a brake pedal position BP or the driver's depression amount of a brake pedal 85 from a brake pedal position sensor 86, and a vehicle speed V from a vehicle speed sensor 88. The hybrid electronic control unit 70 communicates with the engine ECU 24, the motor ECU 40, and the battery ECU 52 via its communication port to receive and send the diversity of control signals and data from and to the engine ECU 24, the motor ECU 40, and the battery ECU 52 as mentioned above.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 3:
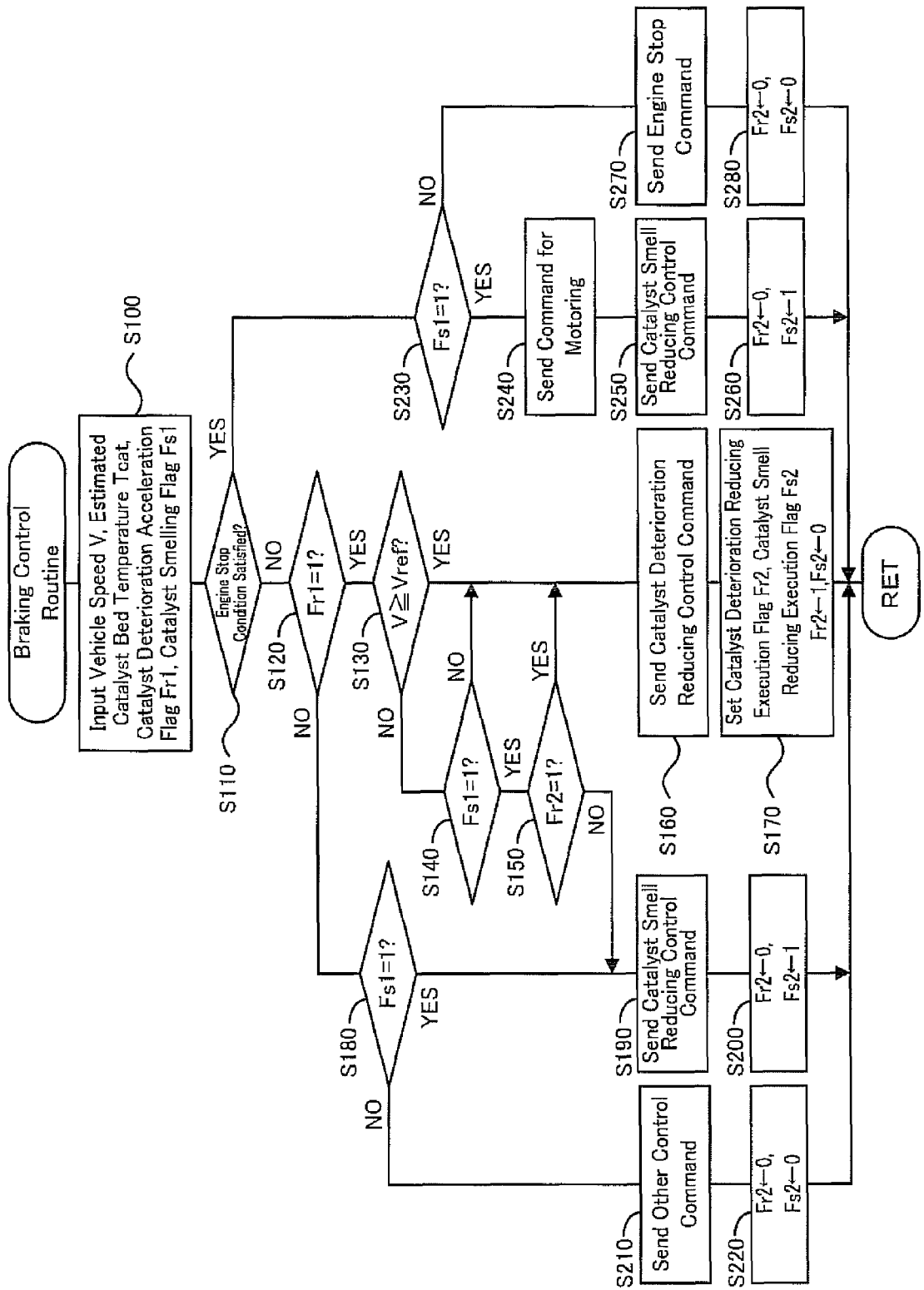
FIG. 3 is a flowchart showing a braking control routine executed by a hybrid electronic control unit 70 in the embodiment.

The description regards the operations of the hybrid vehicle 20 of the embodiment having the configuration discussed above, especially a series of operations in braking condition. FIG. 3 is a flowchart showing a braking control routine executed by the hybrid electronic control unit 70. This braking control routine is repeatedly executed at preset time intervals, for example, at every several msec, while the engine 22 is in operation and a driver releases the accelerator pedal 83 or depresses the brake pedal 85 to apply a braking force.

In the braking control routine, the CPU 72 of the hybrid electronic control unit 70 first inputs various data required for control, that is, the vehicle speed V from the vehicle speed sensor 88, an estimated catalyst bed temperature Tcat defined as an estimated temperature of the three-way catalyst 134a, a catalyst deterioration acceleration flag Fr1 representing whether the deterioration of the three-way catalyst 134a is accelerated or not, a catalyst smelling flag Fs1 representing whether the three-way catalyst 134a smells or not (step S100). The estimated catalyst bed temperature Tcat is estimated in a catalyst bed temperature estimation routine (not shown) executed by the engine ECU 24 based on the data such as the rotation speed Ne and the load factor KL of the engine 22, and is received from the engine ECU 24 by communication. The catalyst deterioration acceleration flag Fr1 and the catalyst smelling flag Fs1 are respectively set in a catalyst deterioration acceleration flag setting routine and a catalyst smelling flag setting routine, and are received from the engine ECU 24 by communication. The description regarding the braking control routine is temporarily suspended, and the catalyst deterioration acceleration flag setting routine and a catalyst smelling flag setting routine are described hereafter.

Figure 4:
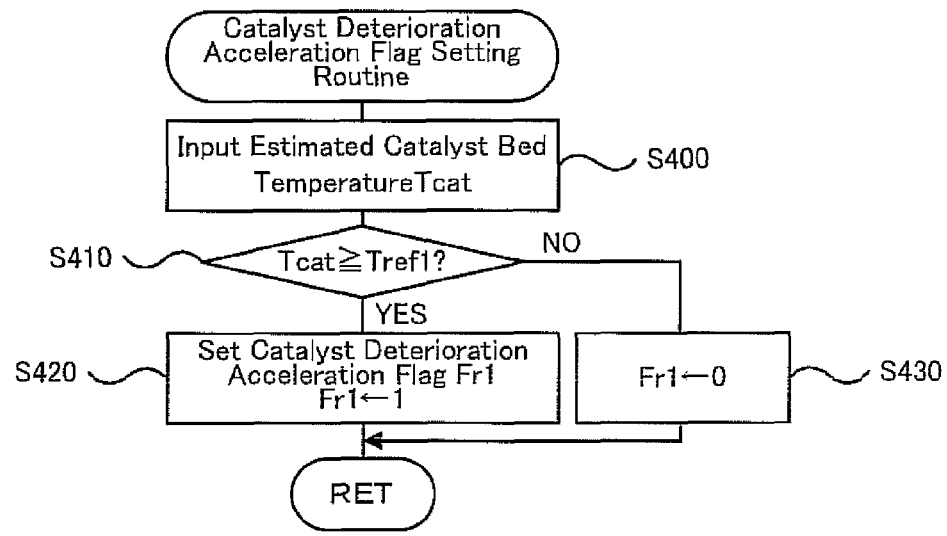
FIG. 4 is a flowchart showing a catalyst deterioration acceleration flag setting routine executed by an engine ECU 24 in the embodiment.

The catalyst deterioration acceleration flag setting routine is initially described. FIG. 4 is a flowchart showing a catalyst deterioration acceleration flag setting routine repeatedly executed at preset time intervals, for example, at every several msec, by the engine ECU 24. In the catalyst deterioration acceleration flag setting routine, the CPU 24a of the engine ECU 24 first inputs the estimated catalyst bed temperature Tcat estimated in a catalyst bed temperature estimation routine described above (step S400). It is then identified whether a catalyst deterioration acceleration condition is satisfied or not, that is, whether the input estimated catalyst bed temperature Tcat is more than or equal to a preset temperature Tref1 or not (step S410). The preset temperature Tref1 is a temperature in proximity to the lower limit of a range of high temperatures in which the three-way catalyst 134a deteriorates when exposed to a lean atmosphere, and is set to, for example, 750 degrees centigrade or 850 degrees centigrade. When the estimated catalyst bed temperature Tcat is more than or equal to the preset temperature Tref1, the catalyst deterioration acceleration flag Fr1 is set equal to '1' representing a deterioration of the catalyst is easily accelerated (step S420). When the estimated catalyst bed temperature Tcat is less than the preset temperature Tref1, the catalyst deterioration acceleration flag Fr1 is set equal to '0' representing the deterioration of the catalyst is not easily accelerated (step S430). This routine is then terminated.

Figure 5:
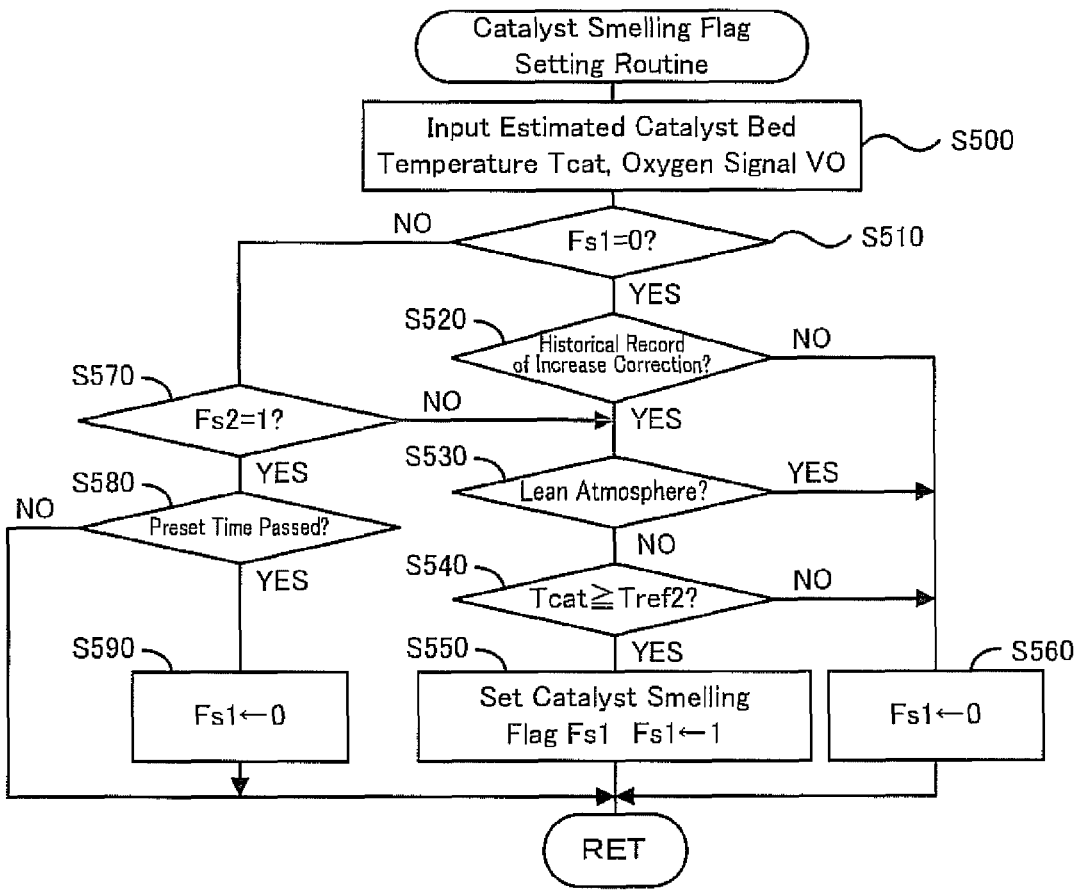
FIG. 5 is a flowchart showing a catalyst smelling flag setting routine executed by an engine ECU 24 in the embodiment.

The catalyst smelling flag setting routine is described next. FIG. 5 is a flowchart showing a catalyst smelling flag setting routine repeatedly executed at preset time intervals, for example, at every several msec, by the engine ECU 24. In the catalyst smelling flag setting routine, the CPU 24a of the engine ECU 24 first inputs the estimated catalyst bed temperature Tcat and the oxygen signal VO from the oxygen sensor 135b (step S500), and it is identified whether the catalyst smelling flag Fs1 is equal to 0 or not (step S510). This catalyst smelling flag Fs1 is set as its initial value equal to '0' and is set equal to '1' when it is identified that a catalyst smell is easily caused to occur in the processing of this routine. Upon identification of the catalyst smelling flag Fs1 set equal to '0', it is identified respectively whether a catalyst smelling condition is satisfied, that is, whether there is a historical record showing an execution of an increase correction of a fuel amount at the time prior to starting this routine (step S520), whether the three-way catalyst 134a is exposed to a lean atmosphere according to whether the input oxygen signal VO represents an output signal on the lean side (step S530), and whether the estimated catalyst bed temperature Tcat is more than or equal to a preset temperature Tref2 (step S540). The increase correction of a fuel amount is defined here as using a computed amount for a fuel injection amount, and the computed amount is the product of a correction coefficient (which is more than 1.0) and a fuel injection base amount which is calculated based on the data such as the amount of intake air and the temperature of intake air to attain a stoichiometric air-fuel ratio. The increase correction is made, for example, to cool the catalytic conversion unit 134 or to enhance the output from the engine 22. The smell of the three-way catalyst 134a is given by hydrogen sulfide (H2S), occurs through reduction to hydrogen sulfide by desulfurization from the three-way catalyst 134a when the three-way catalyst 134a is exposed to a rich atmosphere while the sulfur content included in fuel is occluded and accumulated in the three-way catalyst 134a, and is prevented from occurring when the three-way catalyst 134a is exposed to a lean atmosphere for causing hard desulfurization from the three-way catalyst 134a. It is known that the occurrence of this reaction is accelerated when catalyst bed is at a high temperature (for example, 600 degrees centigrade). Thus, the catalyst smell is easily caused to occur in a case that the three-way catalyst 134a is not exposed to a lean atmosphere after an exposure to a rich atmosphere and is at a temperature more than or equal to the preset temperature Tref2 which is, for example, 600 degrees centigrade or 700 degrees centigrade. Therefore, upon satisfaction of the catalyst smelling condition, that is, there is a historical record of the increase correction, the three-way catalyst 134a is not exposed to a lean atmosphere, and the estimated catalyst bed temperature Tcat is equal to or more than the preset temperature Tref2, the catalyst smelling flag Fs1 is then set equal to '1' representing that the catalyst smell is easily caused to occur (step S550). Upon dissatisfaction of the catalyst smelling condition, that is, there is not a historical record of the increase correction, the three-way catalyst 134a is exposed to a lean atmosphere, or the estimated catalyst bed temperature Tcat is less than the preset temperature Tref2, the catalyst smelling flag Fs1 is then set equal to '0' representing that the catalyst smell is not easily caused to occur (step S560) This routine is then terminated. After the catalyst smelling flag Fs1 is set equal to '1', it is identified that the catalyst smelling flag is not equal to '0' at the following processing of step S510, it is then identified whether a catalyst smell reducing execution flag Fs2 is equal to '1' or not (step S570). This catalyst smell reducing execution flag Fs2 is set as its initial value to '0', and is set to '1' when a catalyst smell reducing control command is send at the processing in the braking control routine. Upon identification of the catalyst smell reducing execution flag Fs2 equal to '1', it is identified whether a preset time has passed or not since the execution of the catalyst smell reducing control is started (step S580). When it is identified that the preset time has passed, it is regarded that the catalyst smell reducing control is completed, the catalyst smelling flag Fs1 is set equal to '0' (step S590), and this routine is terminated. The preset time is set to, for example, 1 second, as a necessary time for the three-way catalyst 134a to be exposed to a lean atmosphere by the catalyst smell reducing control. On the other hand, upon identification of the catalyst smell reducing execution flag Fs2 equal to '0' at the processing of step S570, it is regarded that the catalyst smell reducing control is not executed though it is easily caused for the catalyst to smell, a series of the processing from step S530 is repeatedly executed, and this routine is terminated. In the execution of this processing, the catalyst smelling condition is resolved depending on an operation state of the engine 22 and the catalyst smelling flag Fs1 is set equal to '0' at the processing of step S560, while the catalyst smelling flag Fs1 is kept to '1' at the processing of step S550 when the catalyst smelling condition is not resolved.

The description of the braking control routine in FIG. 3 is resumed. After the data input, it is identified whether an engine stop condition is satisfied or not (step S110). The engine stop condition is, for example, satisfied when the engine is driven in a range of low load where the efficiency of engine is relatively low (for example, when the vehicle speed V is a relatively low speed) and the state of charge (SOC) of the battery 50 is in good condition. Upon dissatisfaction of the engine stop condition, it is identified whether the input catalyst deterioration acceleration flag Fr1 is set equal to '1' or not (step S120). Upon identification of the catalyst deterioration acceleration flag Fr1 equal to '1', it is decided whether the vehicle speed V is more than or equal to a preset vehicle speed Vref (step S130). The preset vehicle speed Vref is predetermined as a vehicle speed at which the emitted catalyst smell does not stay around the vehicle and the catalyst smell becomes few problems, for example, 80 km/h or 90 km/h. Accordingly, upon the decision of the vehicle speed V more than or equal to the preset vehicle speed Vref at the processing of step S130, the execution of the catalyst deterioration reducing control is able to be prioritized regardless of the setting of the catalyst smelling flag Fs1, a catalyst deterioration reducing control command is send to engine ECU 24 (step S160), a catalyst deterioration reducing execution flag Fr2 is set equal to '1' representing the state under execution while the catalyst smell reducing execution flag Fs2 is set equal to '0' representing the state of no execution (step S170), and this routine is terminated. The engine ECU 24 receives the signal of the catalyst deterioration reducing control command and performs control such as the air intake amount control, the fuel injection control, and the ignition control so that the engine 22 idles at the idling rotation speed in prohibition of the fuel cutoff. This ensures that the three-way catalyst 134a at a high temperature is exposed to not the air but the exhaust gas generated from the combustion of the air-fuel mixture and is thus not exposed to a lean atmosphere, and enables to reduce deterioration of the catalyst.

Upon the decision of the vehicle speed V less than the preset vehicle speed Vref at the processing of step S130, it is identified respectively whether the input catalyst smelling flag Fs1 is set equal to '1' (step S140), and whether the catalyst deterioration reducing execution flag Fr2 is set equal to '1' (step S150). When the catalyst smelling flag Fs1 is not equal to '1', or when the catalyst deterioration reducing execution flag Fr2 is set equal to '1' while the catalyst smelling flag Fs1 is set equal to '1', a series of the processing from step S160 is executed, that is, the processing for the catalyst deterioration reducing control is executed, and this routine is terminated. This ensures not to execute the catalyst smell reducing control regardless of the catalyst smelling flag Fs1 equal to '1' when the vehicle speed V becomes less than the preset vehicle speed Vref while the catalyst deterioration reducing control is under execution. On the other hand, when the catalyst smelling flag Fs1 is set equal to '1' and the catalyst deterioration reducing execution flag Fr2 is not set equal to '1', that is, the catalyst deterioration reducing control is not under execution, a catalyst smell reducing control command is send to the engine ECU 24 (step S190), a catalyst deterioration reducing execution flag Fr2 is set equal to '0' representing the state of no execution while the catalyst smell reducing execution flag Fs2 is set equal to '1' representing the state under execution (step S200), and this routine is terminated. The engine ECU 24 receives the signal of the catalyst smell reducing control command and performs controls such as the air intake amount control in the state of the fuel cutoff, that is, in the state that the fuel injection and the ignition are stopped. This ensures that the three-way catalyst 134a is exposed to not the exhaust gas generated from the combustion of the air-fuel mixture but the air and is thus not exposed to a rich atmosphere, and enables to reduce the occurrence of the catalyst smell.

Upon identification of the catalyst deterioration acceleration flag Fr1 not equal to '1' at the processing of step S120, it is identified whether the input catalyst smelling flag Fs1 is set equal to '1' or not (step S180). Upon identification of the catalyst smelling flag Fs1 equal to '1', a series of the processing after step S190 is executed, that is, the processing for the catalyst smell reducing control is executed, and this routine is terminated. Upon identification of the catalyst smelling flag Fs1 not equal to '1' at the processing of step S180, it is regarded that neither the catalyst deterioration reducing control nor the catalyst smell reducing control is required, the other control command according to the state of the vehicle is send to the engine ECU 24 (step S210), both the catalyst deterioration reducing execution flag Fr2 and the catalyst smell reducing execution flag Fs2 are set equal to '0' representing the state of no execution (step S220), and this routine is terminated.

Upon satisfaction of the engine stop condition at the processing of step S110, it is identified whether the input catalyst smelling flag Fs1 is set equal to '1' or not (step S230). Upon identification of the catalyst smelling flag Fs1 equal to '1', a torque command of the motor MG1 is send to the motor ECU 40 so that a motoring of the engine 22 at a preset rotation speed (for example, 1000 rpm) is performed (step S240), the catalyst smell reducing control command is send to the engine ECU 24 (step S250), and the catalyst deterioration reducing execution flag Fr2 is set equal to '0' representing the state of no execution while the catalyst smell reducing execution flag Fs2 is set equal to '1' representing the state under execution (step S260). This routine is then terminated. This motoring of the engine 22 is continuously performed until identification of the catalyst smelling flag Fs1 equal to '0' at the processing of step S230, that is until the time when it is identified that the preset time has passed at the processing of step S580 of the catalyst smelling flag setting routine in FIG. 5. Upon identification of the catalyst smelling flag Fs1 not equal to '1' at the processing of step S230, it is regarded that the engine 22 may be automatically stopped without the execution of the catalyst smell reducing control, an engine stop command is send to the engine ECU 24 (step S270), and the catalyst deterioration reducing execution flag Fr2 and the catalyst smell reducing execution flag Fs2 are set equal to '0' representing the state of no execution (step S280). This routine is then terminated. This ensures to execute the catalyst smell reducing control until the engine 22 is actually stopped upon satisfaction of the engine stop condition. In this connection, there is a case where the catalyst deterioration reducing execution flag Fr2 is set equal to '1' or the catalyst deterioration acceleration flag Fr1 is set equal to '1' during satisfaction of the engine stop condition, it is however not necessary to execute the catalyst deterioration reducing control before the automatic stop of the engine 22 since the three-way catalyst 134a is at least not led to the exposure to the air, that is, to the exposure to a lean atmosphere and deterioration of the three-way catalyst 134a is thus not accelerated if the operation of the engine 22 is stopped.

Figure 6:
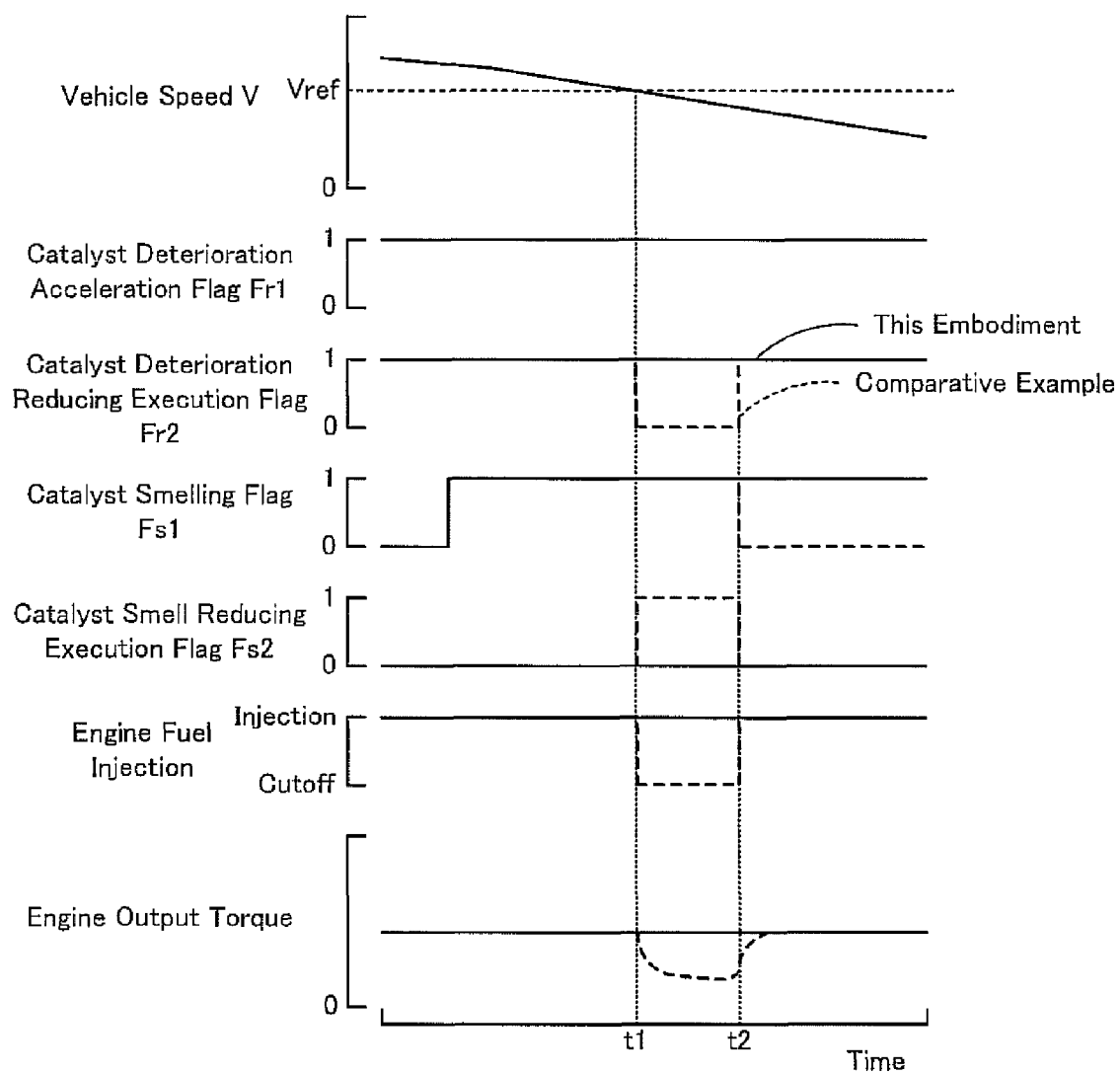
FIG. 6 shows time changes of each value of the respective flags, engine output torque and so on in the case where the both of the catalyst smelling flag Fs1 and the catalyst deterioration reducing execution flag Fr2 are set equal to 1 when the vehicle speed V becomes less than the preset vehicle speed Vref.

The description below regards the reason why the catalyst smell reducing control is not executed regardless of the catalyst smelling flag Fs1 equal to '1' when the vehicle speed V becomes less than the preset vehicle speed Vref while the catalyst deterioration reducing control is under execution. FIG. 6 shows time changes of each value of the respective flags, engine output torque and so on in the case where the both of the catalyst smelling flag Fs1 and the catalyst deterioration reducing execution flag Fr2 are set equal to '1' when the vehicle speed V becomes less than the preset vehicle speed Vref. The dotted line in the figure shows a comparative example where a higher priority is given to the execution of the catalyst smell reducing control than the execution of the catalyst deterioration reducing control when the vehicle speed V becomes less than the preset vehicle speed Vref under the setting of the catalyst smelling flag Fs1 equal to '1'. In the comparative example, when the vehicle speed V becomes less than the preset vehicle speed Vref (time T1), the execution of the catalyst smell reducing control is started while the catalyst deterioration reducing control is suspended, and then the catalyst smell reducing execution flag Fs2 is set equal to '1' and the catalyst deterioration reducing execution flag Fr2 is set equal to '0'. At this time, the catalyst deterioration acceleration flag Fr1 is kept equal to '1' since the catalyst deterioration reducing control is not completed. When the preset time has passed since the execution of the catalyst smell reducing control is started (time T2), the catalyst smell reducing control is completed and the both of the catalyst smelling flag Fs1 and the catalyst smell reducing execution flag Fs2 are set equal to '0'. Then, the catalyst deterioration reducing control is resumed since the catalyst deterioration acceleration flag Fr1 is set equal to '1', and the catalyst deterioration reducing execution flag Fr2 is set equal to '1'. According to this series of the processing, in the engine 22, the engine output torque is temporarily decreased since the fuel cutoff is temporarily performed after a fuel injection is performed and the fuel injection is then performed again. Therefore, in the comparative example, the temporal decline of the engine output torque may cause a shock to the vehicle and give unpleasantness to the driver or passenger. In this embodiment, in order to prevent the occurrence of the shock, the catalyst smell reducing control is not executed regardless of the catalyst smelling flag Fs1 equal to '1' when the vehicle speed V becomes less than the preset vehicle speed Vref while the catalyst deterioration reducing control is under execution. For this reason a higher priority is given to the execution of the catalyst deterioration reducing control than the execution of the catalyst smell reducing control when the vehicle speed V becomes less than the preset vehicle speed Vref in this embodiment, the shock due to the temporal decline of the engine output torque is prevented and a sense of incompatibility given to the driver or passenger is reduced.

Figure 7:
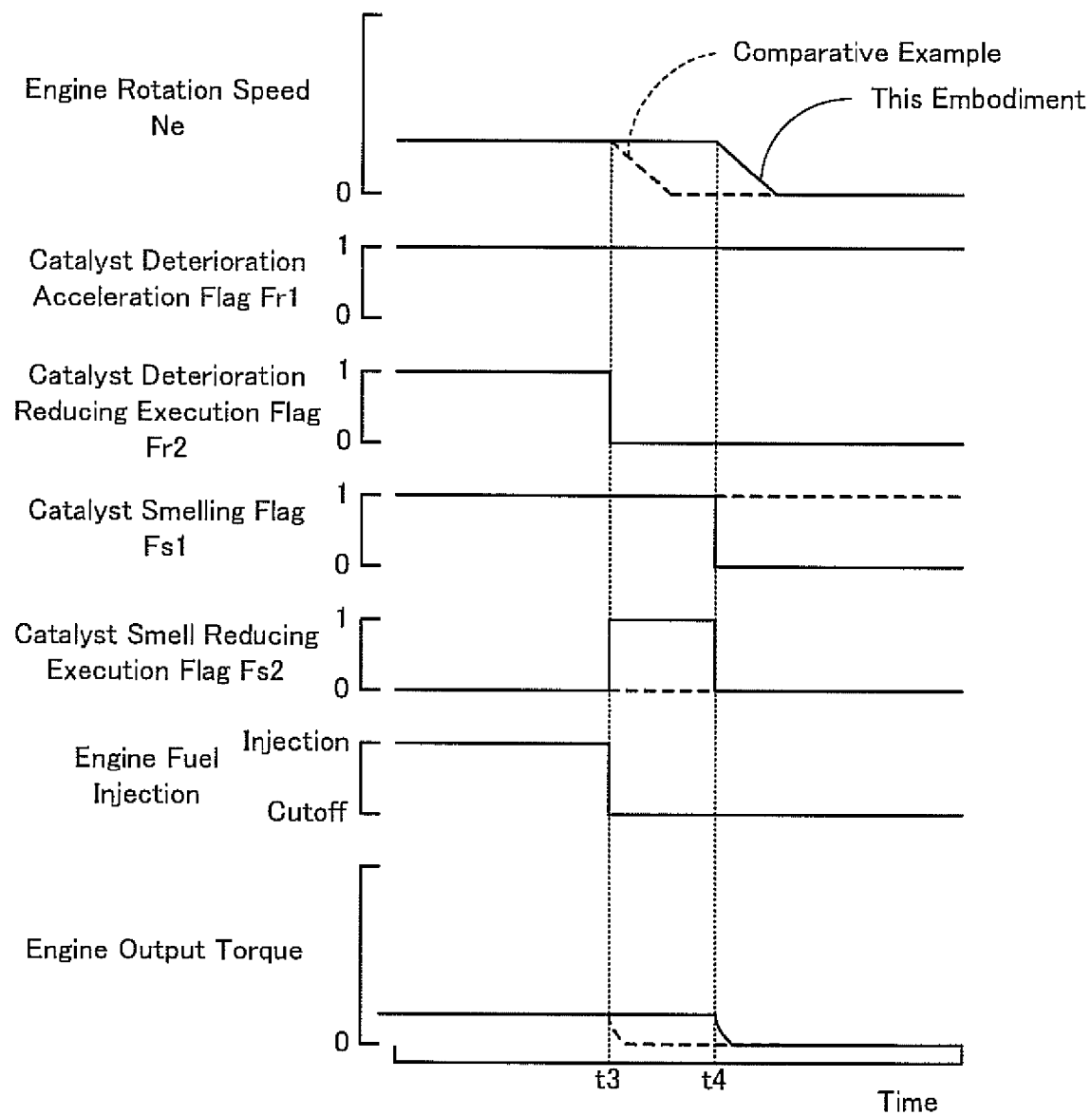
FIG. 7 shows time changes of each value of the respective flags, engine output torque and so on in the case where the catalyst smelling flag Fs1 is set equal to 1 when the engine stop condition is satisfied.

The description below regards the reason why the catalyst smell reducing control is executed when the catalyst smelling flag Fs1 is set equal to '1' and the engine stop condition is satisfied. FIG. 7 shows time changes of each value of the respective flags, engine output torque and so on in the case where the catalyst smelling flag Fs1 is set equal to 1 when the engine stop condition is satisfied. The dotted line in the figure shows a comparative example where the operation of the engine 22 is immediately stopped when the engine stop condition is satisfied. In the comparative example, when the engine stop condition is satisfied (time t3), the fuel cutoff is immediately performed to stop the operation of the engine 22. In this embodiment contrary to the comparative example, after the preset time is passed with a motoring of engine 22 by the motor MG1 (time T4), the operation of the engine 22 is stopped. Accordingly, the catalyst smell reducing control is assuredly executed so as to enable to prevent the occurrence of the catalyst smell. On this occasion, the shock described above does not become a problem since the operation of the engine 22 is stopped after the completion of the catalyst smell reducing control and the catalyst deterioration reducing control is not executed again. For this reason, that is, since there is not a case where the shock described above becomes a problem on the occasion of the automatic stop of the engine 22, the catalyst smell reducing control is executed when the catalyst smelling flag Fs1 is set equal to '1' and the engine stop condition is satisfied.

In the hybrid vehicle 20 of the embodiment described above, the catalyst smell reducing control in which the fuel cutoff is performed is not executed regardless of the catalyst smelling flag Fs1 equal to '1' when the vehicle speed V becomes less than the preset vehicle speed Vref while the catalyst deterioration reducing control in which the fuel cutoff is prohibited is being executed. Such control ensures to prevent the occurrence of the shock due to the temporal decline of the output torque from the engine 22 caused by the temporal suspension of the execution of the catalyst deterioration reducing control. Therefore, the occurrence of the shock due to the execution of the catalyst deterioration reducing control and the catalyst smell reducing control is reduced, and a sense of incompatibility given to the driver or passenger is thus reduced. Furthermore, the catalyst smell reducing control is executed when the catalyst smelling flag Fs1 is set equal to '1' and the engine stop condition is satisfied. Such control ensures to execute the catalyst smell reducing control more assuredly.

In the hybrid vehicle 20 of the embodiment, the catalyst smell reducing control is executed when the automatic stop condition of the engine 22 is satisfied. This is not essential and the catalyst smell reducing control may not be executed when the automatic stop condition of the engine 22 is satisfied in one possible modification.

In the hybrid vehicle 20 of the embodiment, the estimated catalyst bed temperature Tcat which is estimated based on such data as the rotation speed Ne and the load factor KL of the engine 22 is used as a temperature of the three-way catalyst 134a. In one modified embodiment, the detected temperature from a temperature sensor directly attached to the catalytic conversion unit 134 may be used as the temperature of the three-way catalyst 134a.

In the hybrid vehicle 20 of the embodiment, the catalyst smell reducing control is completed when the preset time has passed since the execution of the catalyst smell reducing control is started in the catalyst smelling flag setting routine of FIG. 5. This is not essential and the catalyst smell reducing control may be completed when the summation of air intake amount since the execution of the catalyst smell reducing control is started reaches a preset amount that is sufficient for the three-way catalyst 134a to be exposed to a lean atmosphere in one modified embodiment.

In the hybrid vehicle 20 of the embodiment, the preset temperature Tref1 in the catalyst deterioration acceleration flag setting routine of FIG. 4 and the preset temperature Tref2 in the catalyst smelling flag setting routine of FIG. 5 are set to different temperatures. In one modified embodiment, the preset temperature Tref1 and the preset temperature Tref2 may be set to the same temperature.

Figure 8:
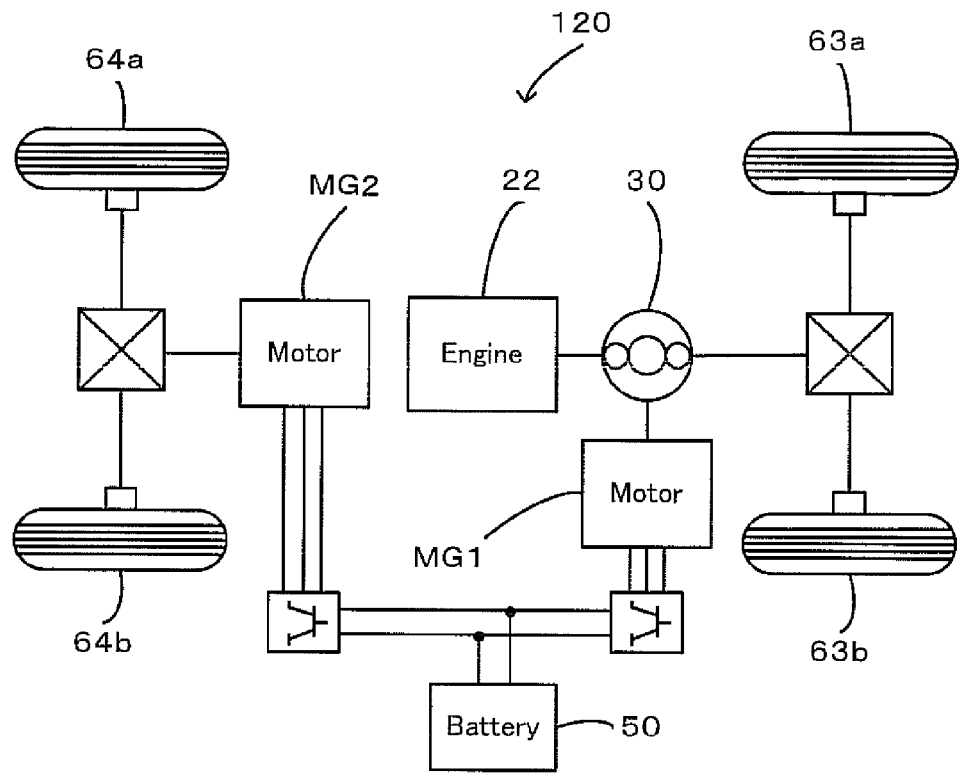
FIG. 8 schematically illustrates the configuration of another hybrid vehicle 120 in one modified example.

In the hybrid vehicle 20 of the embodiment, the power of the motor MG2 is subjected to speed reduction by the reduction gear 35 and is output to the ring gear shaft 32a. The technique of the invention is, however, not restricted to the hybrid vehicle of this configuration but is also applicable to a hybrid vehicle 120 of a modified configuration shown in FIG. 8. In the hybrid vehicle 120 of FIG. 8, the power of the motor MG2 is connected to another axle (an axle linked with wheels 64a and 64b) that is different from an axle connecting with the ring gear shaft 32a (an axle linked with drive wheels 63a and 63b).

Figure 9:
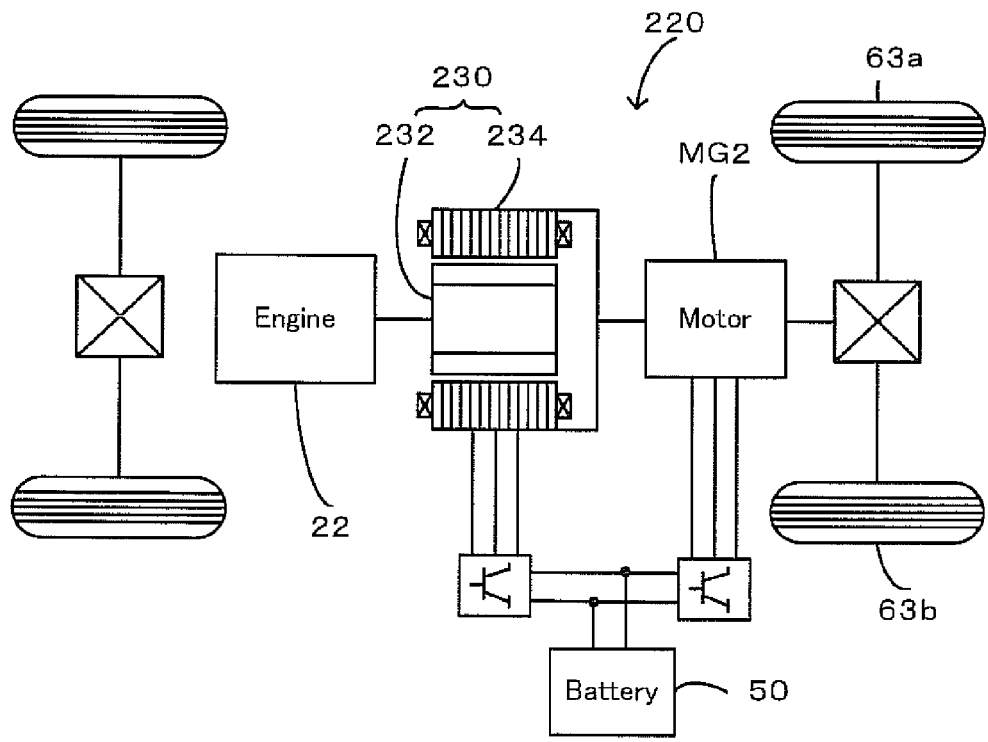
FIG. 9 schematically illustrates the configuration of still another hybrid vehicle 220 in another modified example.

In the hybrid vehicle 20 of the embodiment, the power of the engine 22 is output via the power distribution integration mechanism 30 to the ring gear shaft 32a or the driveshaft linked with the drive wheels 63a and 63b. The technique of the invention is, however, not restricted to the hybrid vehicle of this configuration but is also applicable to a hybrid vehicle 220 of another modified configuration shown in FIG. 9. The hybrid vehicle 220 of FIG. 9 is equipped with a pair-rotor motor 230. The pair-rotor motor 230 includes an inner rotor 232 connected to the crankshaft 26 of the engine 22 and an outer rotor 234 connected to a driveshaft for outputting power to drive wheels 63a and 63b. The pair-rotor motor 230 transmits part of the output power of the engine 22 to the driveshaft, while converting the residual engine output power into electric power.

Figure 10:
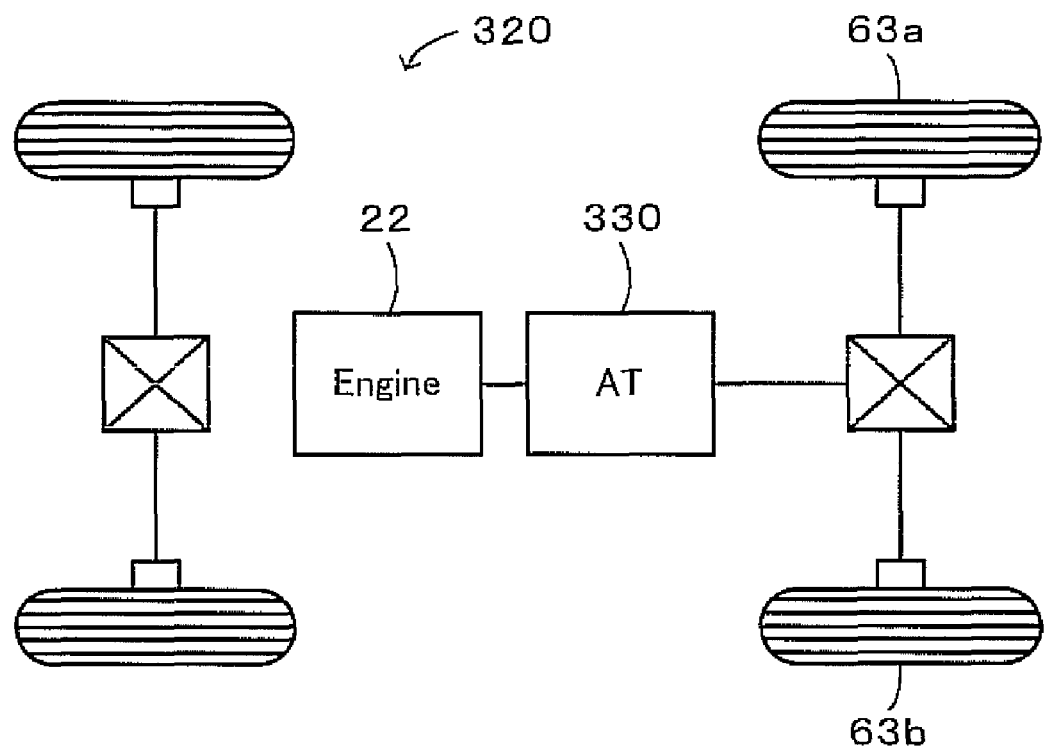
FIG. 10 schematically illustrates the configuration of vehicle 320 in still another modified example.

The technique of the invention is not restricted to these hybrid vehicles but may be actualized by diversity of other embodiments having an internal combustion engine, for example, a conventional vehicle comprising an engine 22 and an automatic transmission (AT) 330 as shown in FIG. 10. The technique of the invention may also be actualized as a control method of such a vehicle.

The primary elements in the embodiment and its modified examples are mapped to the primary constituents in the disclosure of the invention as described below. The engine 22 in the embodiment corresponds to the 'internal combustion engine' in the disclosure of the invention. The fuel injection valve 126 and the engine ECU 24 which controls the fuel injection valve 126 in the embodiment correspond to the 'fuel injection unit' in the disclosure of the invention. The vehicle speed sensor 88 in the embodiment corresponds to the 'vehicle speed measurement unit' in the disclosure of the invention. The hybrid electronic control unit 70 executing the processing of steps S120 and S160 in the braking control routine of FIG. 3 to send the catalyst deterioration reducing control command to the engine ECU 24 when the catalyst deterioration acceleration flag Fr1 is set equal to '1', and the engine ECU 24 receiving the signal of the catalyst deterioration reducing control command and performing controls such as the air intake amount control, the fuel injection control, and the ignition control so that the engine 22 idles at the idling rotation speed in prohibition of the fuel cutoff in the embodiment correspond to the 'catalyst deterioration reducing control module' in the disclosure of the invention. The hybrid electronic control unit 70 executing the processing of steps S130 to S150 and S190 in the braking control routine of FIG. 3 to send the catalyst smell reducing control command to the engine ECU 24 when the vehicle speed becomes less than the preset vehicle speed Vref while the catalyst smelling flag Fs1 is set equal to '1' and not to send the catalyst smell reducing control command to the engine ECU 24 even when the vehicle speed becomes less than the preset vehicle speed Vref while the catalyst deterioration reducing execution flag Fr2 is set equal to '1' and the processing of steps S230 to S250 in the braking control routine of FIG. 3 to send the command for the motoring to the motor ECU 40 and the catalyst smell reducing control command to the engine ECU 24 when the engine stop condition is satisfied and the catalyst smelling flag Fs1 is set equal to '1', and the engine ECU 24 receiving the catalyst smell reducing control command and performing controls such as the air intake amount control in the state of the fuel cutoff in the embodiment correspond to the 'catalyst smell reducing control module' in the disclosure of the invention. The hybrid electronic control unit 70 executing the processing of steps S110 and S270 in the braking control routine of FIG. 3 to send the engine stop command to the engine ECU 24 when the engine stop condition is satisfied and the engine ECU 24 receiving the engine stop command to stop the operation of the engine 22 in the embodiment correspond to the 'automatic start stop module' in the disclosure of the invention. The motor MG1 and the power distribution integration mechanism 30 in the embodiment correspond to the 'motoring unit' in the disclosure of the invention. The motor MG1 in the embodiment corresponds to the 'motor' in the disclosure of the invention. The power distribution integration mechanism 30 in the embodiment corresponds to the 'three shaft-type power input output structure' in the disclosure of the invention. The pair-rotor motor 230 in the modified example also corresponds to 'motoring unit' in the disclosure of the invention.

The 'internal combustion engine' is not restricted to the internal combustion engine designed to consume a hydrocarbon fuel, such as gasoline or light oil, and thereby output power, but may be an internal combustion engine of any other design, for example, a hydrogen engine. The 'fuel injection unit' is not restricted to the fuel injection valve 126 and the engine ECU 24, but may be any fuel injection unit that injects fuel. The 'vehicle speed measurement unit' is not restricted to the vehicle speed sensor 88, but may be any vehicle speed measurement unit that measures a vehicle speed. The 'catalyst deterioration reducing control module' is not restricted to the combination of the hybrid electronic control unit 70 and the engine ECU 24, but may be actualized by a single electronic control unit. The processing executed by the 'catalyst deterioration reducing control module' is not restricted to performing controls such as the air intake amount control, the fuel injection control, and the ignition control so that the engine 22 idles at the idling rotation speed in prohibition of the fuel cutoff when the catalyst deterioration acceleration flag Fr1 is set equal to '1', but may be executing a catalyst deterioration reducing control that operates the internal combustion engine while prohibiting a cutoff of fuel injection of the fuel injection unit upon a satisfaction of a catalyst deterioration acceleration condition that accelerates deterioration of the purifying catalyst. The 'catalyst smell reducing control module' is not restricted to the combination of the hybrid electronic control unit 70 and the engine ECU 24, but may be actualized by a single electronic control unit. The processing executed by the 'catalyst smell reducing control module' is not restricted to performing controls such as the air intake amount control in the state of the fuel cutoff when the vehicle speed becomes less than the preset vehicle speed Vref while the catalyst smelling flag Fs1 is set equal to '1', not performing the fuel cutoff even when the vehicle speed becomes less than the preset vehicle speed Vref while the catalyst smelling flag Fs1 and the catalyst deterioration reducing execution flag Fr2 are set equal to '1', and performing controls such as the air intake amount control in the state of the fuel cutoff together with the motoring of the engine 22 by the motor MG1 when the engine stop condition is satisfied and the catalyst smelling flag Fs1 is set equal to '1', but the processing executed by the 'catalyst smell reducing control module' is may be executing a catalyst smell reducing control that operates the internal combustion engine while making the fuel injection unit perform the cutoff of fuel injection when the measured vehicle speed becomes less than a specific vehicle speed upon a satisfaction of a catalyst smelling condition that makes the purifying catalyst smell, and not executing the catalyst smell reducing control regardless of the satisfaction of the catalyst smelling condition when the measured vehicle speed becomes less than the specific vehicle speed while the catalyst deterioration reducing control is being executed. The 'automatic start stop module' is not restricted to the combination of the hybrid electronic control unit 70 and the engine ECU 24, but may be actualized by a single electronic control unit. The processing executed by the 'automatic start stop module' is not restricted to stopping the operation of the engine 22 when the engine stop condition is satisfied, but may be stopping automatically the internal combustion engine upon a satisfaction of a specific stop condition and starting automatically the internal combustion engine upon a satisfaction of a specific start condition. The 'motoring unit' is not restricted to the combination of the motor MG1 and the power distribution integration mechanism 30, or the pair-rotor motor 230, but may be any unit performing a motoring of the internal combustion engine. The 'motor' is not restricted to the motor MG1 constructed as a synchronous motor but may be any type of motor designed to be able to input and output power, for example, an induction motor.

The above mapping of the primary elements in the embodiment and its modified examples to the primary constituents in the disclosure of the invention is not restrictive in any sense but is only illustrative for concretely describing the modes of carrying out the invention. Namely the embodiment and its modified examples discussed above are to be considered in all aspects as illustrative and not restrictive.

There may be many other modifications, changes, and alterations without departing from the scope or spirit of the main characteristics of the present invention.

The disclosure of Japanese Patent Application No. 2008-157639 filed Jun. 17, 2008 including specification, drawings and claims is incorporated herein by reference in its entirety.

INDUSTRIAL APPLICABILITY

The technique of the invention is preferably applied to the manufacturing industries of the vehicle and the automobiles.

The invention claimed is:

1. A vehicle comprising:
an internal combustion engine having a fuel injection unit that injects fuel and a purifying catalyst that purifies exhaust gas;
a vehicle speed measurement unit that measures a vehicle speed;
a catalyst deterioration reducing control module configured to execute a catalyst deterioration reducing control that operates the internal combustion engine while prohibiting a cutoff of fuel injection of the fuel injection unit upon a satisfaction of a catalyst deterioration acceleration condition that accelerates deterioration of the purifying catalyst; and
a catalyst smell reducing control module configured to execute a catalyst smell reducing control that operates the internal combustion engine while making the fuel injection unit perform the cutoff of fuel injection when the measured vehicle speed becomes less than a specific vehicle speed upon a satisfaction of a catalyst smelling condition that makes the purifying catalyst smell, and the catalyst smell reducing control module configured not to execute the catalyst smell reducing control regardless of the satisfaction of the catalyst smelling condition when the measured vehicle speed becomes less than the specific vehicle speed while the catalyst deterioration reducing control is being executed.

2. The vehicle in accordance with claim 1, the vehicle further comprising:
an automatic start stop module configured to stop automatically the internal combustion engine upon a satisfaction of a specific stop condition, and start automatically the internal combustion engine upon a satisfaction of a specific start condition; and
a motoring unit configured to perform a motoring of the internal combustion engine;

wherein the catalyst smell reducing control module executes the catalyst smell reducing control while making the motoring unit perform the motoring of the internal combustion engine regardless of whether the catalyst deterioration reducing control is being executed when the specific stop condition and the catalyst smelling condition are satisfied, and wherein the catalyst smell reducing control module makes the motoring unit stop the motoring of the internal combustion engine so that the automatic start stop module stops the internal combustion engine when it is completed to execute the catalyst smell reducing control.

3. The vehicle in accordance with claim 2, wherein the motoring unit includes:
- a motor capable of inputting and outputting power; and
- a three shaft-type power input output structure that is linked to three shafts, a driveshaft that is connected with an axle, an output shaft of the internal combustion engine, and a rotating shaft of the motor, and inputs and outputs power from and to a residual shaft based on powers input and output from and to any two shafts among the three shafts.

4. The vehicle in accordance with claim 1, wherein the catalyst deterioration reducing control module regards that the catalyst deterioration acceleration condition is satisfied when a temperature of the purifying catalyst is greater than or equal to a first preset temperature to execute the catalyst deterioration reducing control.

5. The vehicle in accordance with claim 1, wherein the catalyst smell reducing control module regards that the catalyst smelling condition is satisfied when there is a historical record of an increase injection in which the fuel injection unit injects more fuel than a fuel injection amount based on a stoichiometric air-fuel ratio, the purifying catalyst has not been exposed to a lean atmosphere since the increase injection, and a temperature of the purifying catalyst is greater than or equal to a second preset temperature, to execute the catalyst smell reduction control.

6. A control method of a vehicle that comprises an internal combustion engine having a fuel injection unit that injects fuel and a purifying catalyst that purifies exhaust gas, the control method comprising the steps of;
- (a) executing a catalyst deterioration reducing control that operates the internal combustion engine while prohibiting a cutoff of fuel injection of the fuel injection unit upon a satisfaction of a catalyst deterioration acceleration condition that accelerates deterioration of the purifying catalyst, and
- (b) executing a catalyst smell reducing control that operates the internal combustion engine while making the fuel injection unit perform the cutoff of fuel injection when a vehicle speed becomes less than a specific vehicle speed upon a satisfaction of a catalyst smelling condition that makes the purifying catalyst smell, and not executing the catalyst smell reducing control regardless of the satisfaction of the catalyst smelling condition when the vehicle speed becomes less than the specific vehicle speed while the catalyst deterioration reducing control is being executed.

\* \* \* \* \*